May 22, 1956     D. GOTTLIEB ET AL     2,746,902
ENDOMYCIN AND PROCESS FOR ITS PRODUCTION
Filed Dec. 8, 1950
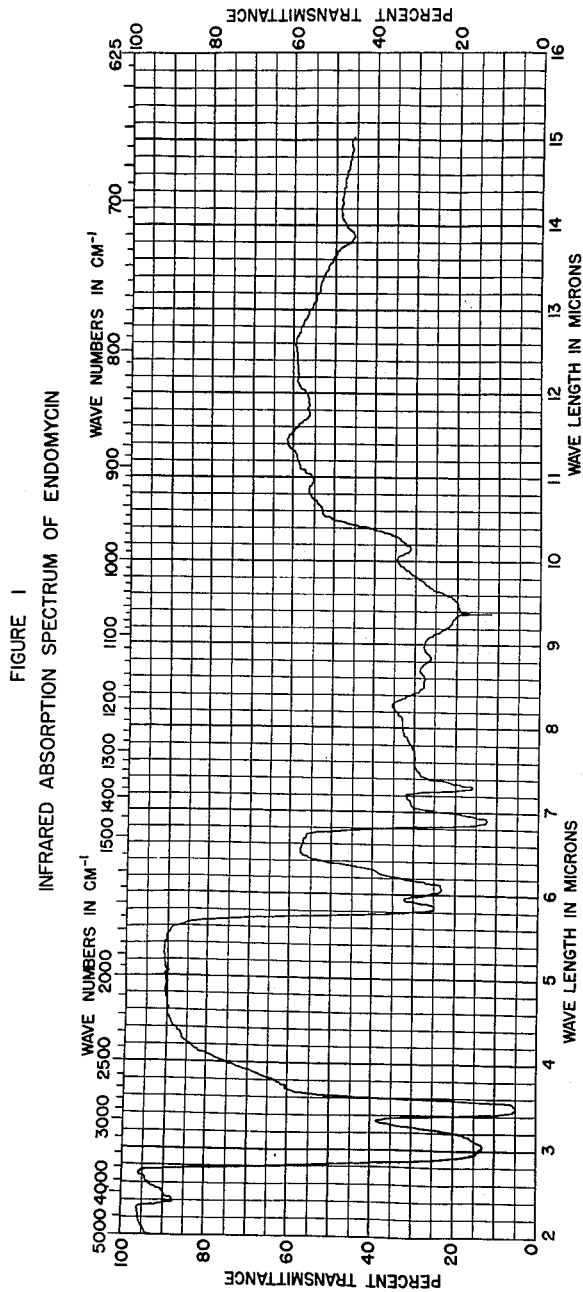
FIGURE I
INFRARED ABSORPTION SPECTRUM OF ENDOMYCIN
DAVID GOTTLIEB
HERBERT E. CARTER
INVENTORS
BY *Gordon W. Hueschen*
ATTORNEY

2,746,902
ENDOMYCIN AND PROCESS FOR ITS PRODUCTION

David Gottlieb, Champaign, and Herbert E. Carter, Urbana, Ill., assignors to The Upjohn Company, Kalamazoo, Mich., a corporation of Michigan Application December 8, 1950, Serial No. 199,914

7 Claims. (Cl. 167—65)

The present invention relates to a new and useful antibiotic having activity against bacteria, fungi and yeasts, herein designated as endomycin, and to methods for its preparation and isolation.

It is an object of the present invention to provide a new and useful antibiotic substance. A further object of the invention is to provide a microorganism that is capable of producing the said antibiotic substance. It is also an object of the invention to provide a process for growing, and culturing the said organism and isolating said antibiotic. Other objects and advantages of the invention, some of which are referred to hereinafter, will be apparent to those skilled in the art to which the invention pertains.

Endomycin is effective as a germicide in vitro against a wide variety of bacteria and fungi as is indicated below, the values representing the quantity of endomycin given as dilution per milliliter that will prevent the growth of the stated organism.

| Fungi | | Bacteria | |
|---|---|---|---|
| Sclerotinia fructicola | 1–5 | Bacillus subtilis | 5–10 |
| Torula utilis | 1–5 | B. cereus | 1–5 |
| Endomyces magnusii | 1–5 | Staphlococcus aureus | 1–5 |
| Mycoderma ceremiseae | 1–5 | Corynebacterium xerose | 1–5 |
| Candida albicans | 5 | Listerella monocytogenes | 1–5 |
| C. guilliermondi | 25 | Erysipelothrix rhusiopathiae | 1–5 |
| Microsporium canis | 7.5 | Brucella abortus 19 | 1–5 |
| Trichophyton interdigitale | 25 | B. abortus 1028 | 1–5 |
| T. rubrum | 25 | Argobacterium tumefaciens | <10 |
| Microsporium audouini | 25 | Mycobacterium tuberculosis | 10–100 |
| Rhizoctonia solani | 25 | Streptococcus faecalis | 10–100 |
| Glomerella cingulata | 25 | Aerobacter aerogenes | >100 |
| Macrosporium sarcinaeforme | 25 | Escherichia coli | >100 |
| Colletotrichum phomoides | 25 | Gram negative rod | >100 |
| Fusarium lycopersici slightly | <25 | Pseudomonas aeruginosa | >100 |

The in-vivo efficacy of endomycin when used in human therapy as a bactericide has not as yet been shown.

Endomycin is very soluble in water at pH seven or greater. At pH 4.0 to pH 6.0 it is very insoluble in water but at pH 2.0 or lower it again becomes very water soluble. The solubility in water at pH 7.0 is greatly reduced in the presence of 0.1 percent to 2.0 percent sodium chloride or by the presence of calcium or magnesium ions. Endomycin which has been precipitated from water by the addition of sodium, calcium or magnesium ions does not redissolve in water readily but is very soluble in fifty percent methanol. Endomycin is also much more soluble in wet butanol than in anhydrous butanol. Water solutions of endomycin have pronounced wetting and detergent properties over the entire pH range. A pronounced lowering of the surface tension up to a maximum of about thirty dyne cm.$^{-1}$ is obtained. Another characteristic is the extremely low concentrations to which micelles are favored. Assuming a molecular weight of 1400, the critical range is found around the concentration of $2 \times 10^{-5}$ M, which is 10 or 100 times lower than that of many other surface active compounds. Water solutions having a pH of about 7.0 to 10.0 are stable when heated to 110 degrees centigrade under pressure in an autoclave. The ultraviolet absorption spectrum shows a doublet with maxima at 226 millimicrons and 232 millimicrons. The $k$ values range from 16.5 to 20.4 at 226 millimicrons and from 16.6 to 21.2 at 232 millimicrons depending upon the purity of the sample tested. Potentiometric titrations indicate that endomycin has at least three functional groups of acid-base character, a weak base $$pK_{a1} = 2.5$$

a weak acid $$pK_{a2} = 5.5 – 6.5$$

and a weaker acid $$pK_{a3} = 9$$

which is also indicated by its acid an alkali solubility given above. The potentiometric titrations indicate a molecular weight of about 1450, while cryoscopic determinations in cyclopentanone indicate a molecular weight of about 1300. As indicated in Figure 1 endomycin has a distinctive infrared absorption spectrum. Among these are absorption maxima (transition minima) at the following wave length expressed in microns and reciprocal centimeters as follows:

| Microns: | Reciprocal centimeters |
|---|---|
| 3.0 | 3335 |
| 3.56 | 2910 |
| 5.82 | 1717 |
| 6.04 | 1655 |
| 6.87 | 1455 |
| 7.28 | 1375 |
| 8.81 | 1135 |
| 9.45 | 1058 |
| 10.15 | 986 |
| 10.97 | 911 |
| 11.71 | 853 |
| 11.91 | 839 |
| 13.90 | 719 |

The above properties show endomycin to be distinctly different from any of the known antibiotics.

The organism which produces the new antibiotic substance of the present invention was isolated from soil collected in the Cache River Valley of Illinois. Structurally and functionally, this organism as found naturally in the soil and as represented by spontaneously or induced mutants, belongs to the genus currently distinguished as Streptomyces. The characteristics of this organism as hereinafter described differentiate it from any species described in Bergey's Manual of Determinative Bacteriology, 6th edition, Williams and Wilkins, Baltimore, 1948. It resembles *Streptomyces albus* in that it produces no soluble pigments, but differs from *S. albus* in that it hydrolyzes starches, does not peptise litmus milk after coagulation, produces an acid reaction and does not readily liquify gelatin while the converse properties are attributed to *Streptomyces albus*. The new organism has been designated *Streptomyces endus*. It has been deposited with the Northern Regional Research Laboratory of the U. S. Department of Agriculture where it has been designated as *Streptomyces endus* NRRL–2339.

*Streptomyces endus* is typically aerobic, not growing under anaerobic conditions. When grown on favorable medium, a substrate mycelium is formed which has no distinct color of its own but which takes on the color of the medium and consists of rather straight ramifying hyphae. A white aerial mycelium develops on the third day which gives rise to sporophores which appear along the entire length of the mycelium at right angles to it.

Continued growth results in a slight bending of the sporophores, followed by twisting and more pronounced spiral formation. The sporophore increases in diameter and its division into spores begins. As growth continues the spores darken and the spiral becomes very compact, resembling a coiled spring, often with ten loops so tightly coiled that when the spiral is broken each turn resembles a doughnut. Sporulation begins in the older portion of the colony and is often present while the younger portion on the periphery are growing so that the white surface of the colony becomes light grey, changing to dark grey. In old cultures the substrate mycelium turns black and disintegrates. The most characteristic macroscopic feature of a culture of S. endus is the greying of the mycelium.

The young peripheral hyphae vary from 0.7 to $1.0\mu$ in diameter, while the older hyphae are thicker having a diameter of 1.25 to $1.50\mu$ and in mature portions of the colony occasionally a diameter of $2.0\mu$. The spirals are $3.5\mu$ to $4.0\mu$ in diameter with an open center of about $1.4\mu$. The spores are not readily detached and tend to adhere to the spiral form.

Carbohydrates which are readily utilized when included in Czapek's alkali medium containing no other source of carbon are starch, mannose, dextrin, glucose, arabinose, maltose and levulose. Gelatin and asparagin can also be used as a source of carbon. Poor growth resulted by the inclusion of galactose, lactose, citric acid, succinic acid, malic acid and cellulose while no growth resulted when sucrose, sorbitol, dulsitol, inositol or paraffin were added to the medium.

The use of Czapek's acid agar with starch as a carbon source results in poor growth of S. endus.

S. endus coagulates litmus milk with the production of an acid reaction but without observable peptonization of the protein. It readily hydrolyzes starch while gelatin is very slowly and only slightly liquified.

Culture of S. endus on potato slants or potato-dextrose agar results in good growth with heavy raised mycelium and light grey surface. Culture on Emerson's agar and nutrient agar gave excelent growth with early greying and sporulation. Culture on tryptone-glucose agar and North's gelatin agar resulted in good growth with white aerial mycelia, but no spiral formation, consequently sporulation was absent.

S. endus never produced a soluble pigment when grown in either the complex natural or the chemically defined media.

Endomycin can be obtained by cultivating an endomycin producing strain of Streptomyces endus, preferably under submerged aerobic conditions, in a nutrient medium containing a carbohydrate, a source of nitrogen and inorganic salts, having a pH of between about 6.5 to about 8.5, at temperatures from about 20 to about 30 degrees centigrade. The major part of the endomycin thus produced is associated with the mycelium, although some of the product is present in the culture fluid. The mycelium and the culture fluid can be separated, as by filtration, and the antibiotic recovered from the filtrate by extraction as with butanol while the antibiotic present in the mycelium can be recovered as explained in greater detail below. However a preferred procedure is to acidify the mycelium containing fermentation liquor to about pH 4–6 before filtration. When this is done the endomycin in the culture fluid is rendered insoluble so that such a small part of the antibiotic appears in the filtrate that the filtrate can be discarded without appreciable loss of endomycin. The filtration is preferably carried out in the presence of a diatomaceous earth filter aid which prevents clogging of the filter by the mycelium with a resulting greatly reduced rate of filtration.

The endomycin is extracted from the mycelium containing filter cake by means of a low molecular weight alcohol. Methanol or ethanol can be used in the anhydrous form but the propyl and butyl alcohols are poor solvents for endomycin unless they are mixed with water. The preferred extracting solvents are mixtures of the lower molecular weight aliphatic alcohols and water, containing from thirty to ninety percent of the alcohol and ten to seventy percent of water, the optimum mixture being dependent upon the particular alcohol used for extraction.

After extraction of the mycelium containing filter cake by an aqueous-lower aliphatic alcohol the extract is concentrated under reduced pressure until most of the alcohol has been removed. When the extracting solvent contains a high percentage of alcohol it is necessary to add additional water to replace the loss during the concentration. The resulting essentially water concentrate of endomycin is extracted with a fat solvent such as chloroform or petroleum ether to remove antifoam compounds added during the fermentation which interfere with subsequent purifications and also interfere with the utility of endomycin in therapy. The aqueous solution, or suspension, is made alkaline to about pH 8–11, preferably pH 8.5–9 by the addition of an alkali metal hydroxide, carbonate or bicarbonate such a sodium hydroxide, potassium hydroxide, sodium carbonate and the like. The mixture is then filtered and the clarified filtrate is acidified to pH 3.5–5, preferably about pH 4.8, whereupon the endomycin precipitates. The precipitated endomycin is collected and dried. It can be further purified by extracting the dry product with a lower aliphatic alcohol, filtering and precipitating the endomycin by the addition of non-polar solvent such as ether, benzene, amyl acetate, chloroform and the like with amyl acetate being preferred. The precipitated endomycin after collection and drying is suitable for therapeutic use.

Assay of endomycin in fermentation liquors is best accomplished by a dilution procedure using T. utilis as the test organism while purified preparations are best assayed by the cup plate method using Candida albicans as the test organism.

The units by the dilution method are determined by experimentally determining the greatest dilution of a complete fermentation broth, including the mycelium, which prevents the growth of Torula utilis. Thus the number of dilution units in any fermentation liquor is equal to the greatest dilution of that brew which inhibits growth of the test organism.

The cup-plate method using Canadida albicans involves a comparison of the potency of the unknown and a preparation III–30–Ill. using 25 percent isopropyl alcohol as a solvent. Preparation III–30–Ill. has been arbitrarily assigned a potency of 1000 units per milligram.

The following examples are illustrative of certain modifications of the present invention but can be varied as to details as will be apparent to those skilled in the art.

*Example 1.—Preparation of vegatative seed culture of Streptomyces endus*

In each of several 500-milliliter flasks was placed 100 milliliters of a medium having the following composition:

| | |
|---|---|
| Corn sugar (cerelose) | grams__ 10 |
| Beef extract | do____ 10 |
| Sodium chloride | do____ 5 |
| Peptone | do____ 5 |
| Water (q. s.) | liter__ 1 |

The flasks and medium were sterilized by heating to 120 degrees centigrade for twenty minutes under a pressure of 15 p. s. i. After cooling each flask was seeded with spores of a culture of S. endus grown on agar. The flasks were placed in a reciprocating type shaker in a room maintained at 24 degrees centigrade. The shaker was started and the culture allowed to grow for about six days at which time it was ready for use as in Example II.

*Example II.—Preparation of seed culture for fermenter*

In a five-gallon bottle provided with a stirrer and sparger twelve liters of medium was placed having the following composition:

| | |
|---|---|
| Corn sugar (cerelose) | grams__ 10 |
| Brewers yeast | do____ 10 |
| Fermentation solubles (Curbay B. G.) | do____ 5 |
| Sodium chloride | do____ 4 |
| Calcium carbonate | do____ 1 |
| Water (q. s) | liter__ 1 | and an antifoam agent composed of 30 milliliters of lard oil containing one percent stenol.

The medium and antifoam agent were stabilized at 120 degrees centigrade in an autoclave under a pressure of 15 p. s. i. as in Example I. The medium was cooled to about 27 degrees centigrade and agitated by the sweep stirrer at 270 R. P. M. Ten milliliters of the culture of *S. endus* obtained as in Example I was added under sterile conditions to the medium. Air was introduced into the bottom of the bottle through the sparger at a rate of about eight liters per minute, a slight pressure being maintained in a bottle at all times. The culture was allowed to grow under these conditions for 48 hours, at which time it was ready for use as in Example III.

*Example III.—Preparation of endomycin*

A one-hundred gallon capacity glass lined tank was used. Agitation was provided by a Heresite coated agitator which turned at a speed of 270 R. P. M. Aeration was accomplished by means of a sparger with jet attachments which directed the air against the direction of rotation of the medium. Air flow was provided at the rate of 300 cubic feet of sterile air per hour with a head pressure of 5 p. s. i. being maintained at all times. To prevent foaming an automatic oil dropper arrangement added an antifoam agent (lard oil plus 1% stenol) to the tank when the head of the foam arising during fermentation made contact with an electrode, about 300–400 milliliters usually being added.

In a tank as described above was placed 240 liters of a medium having the following composition per liter:

| | Grams |
|---|---|
| Corn sugar (cerelose) | 25.0 |
| Brewers yeast | 2.5 |
| Ammonium sulfate | 5.0 |
| Calcium carbonate | 8.0 |
| Sodium chloride | 4.0 |
| Potassium dihydrogen phosphate | 0.4 |
| Soybean meal | 7.0 |

The medium was sterilized in the tank by heating to 120 degrees centigrade under a pressure of 15 p. s. i. for twenty minutes. After cooling the medium was inoculated with *S. endus* by adding the contents of a five gallon bottle prepared as in Example II. The temperature of the medium was maintained at twenty-four degrees during growth.

The culture times and endomycin content in dilution units present are shown in the following table.

TABLE

| Culture Time, Hours | Final pH | Endomycin Content Dilution, Units/ml. |
|---|---|---|
| 44 | 6.9 | trace |
| 64 | 6.7 | 210 |
| 88 | 6.5 | 406 |
| 112 | 7.3 | 433 |
| 136 | 6.8 | 444 |

*Example IV.—Isolation and purification of endomycin (A–214)*

Two-hundred five liters of endomycin containing beer (produced as in Example III with the exception that 4.0 grams of potassium chloride was substituted for sodium chloride) having a pH of 8.2 was acidified to about pH 5.5 by the addition of 300 milliliters of concentrated sulfuric acid. To the acidified beer 2.0 kilograms of diatomaceous earth was added with stirring and the suspension filtered using a plate and frame press. The filter cake was washed with ten liters of water, the filtrate and washings being discarded.

The mycelial cake was removed and heated in an autoclave under a pressure of 10 p. s. i. for ten minutes. The autoclaved filter cake was filtered, washed with water and the combined filtrates (volume 47 liters) were extracted once with twelve liters of butanol and four times with eight-liter portions of butanol. Each extract was cycled through the mycelial cake after extraction of the filtrate. After the last butanol extraction the mycelial cake was washed with ten liters of water to remove bound butanol.

The butanol eluates were combined and distilled under reduced pressure to give an aqueous suspension having a volume of 3800 milliliters (pH 6.5) which was frozen and dried. The solid thus obtained weighed 202 grams and on assay had a potency of 500 dilution units per milligram.

A 121-gram aliquot of this material was suspended by shaking for 2–3 hours, in one liter of ether. The ether was separated from the solid residue and the process repeated using one liter and 300 milliliters of ether respectively. The solid thus obtained was extracted with boiling benzene, the residual light brown solid amounting to 52.1 grams. This material was suspended in about 1.5 liters of water by vigorous stirring for 4 to 5 hours, a turbid emulsion being formed. This emulsion was extracted with ether until the ether extracts were colorless. The aqueous emulsion was centrifuged and the small amount of white precipitate which was collected discarded. The aqueous suspension was then acidified with acetic acid to about pH 4.5. Upon standing overnight a dark brown gummy precipitate settled, from which the supernatant liquid was decanted. The precipitate was dissolved in 680 milliliters of about 0.05 normal sodium hydroxide to give a solution having a pH of about 8.4. The insoluble material was separated and to the resulting clear solution twelve milliliters of glacial acetic acid was added. The resulting precipitate was collected and dried over saturated potassium hydroxide solution and phosporous pentoxide. There was thus obtained 32.9 grams of endomycin assaying 1750 to 2000 dilution units per milligram, a total of 57,557,000 units.

An eleven-gram portion of this material was shaken with 250 milliliters of absolute alcohol for five hours. The insoluble material was removed and to the clear solution eight volumes of ether was added. After repeating this procedure an additional three times there was obtained 2.4 grams of endomycin assaying about 4000 dilution units per milligram.

*Example V.—Isolation and purification of endomycin*

Twenty-five liters of a six-day culture of *S. endus* containing about 150 dilution units per milliliter were decanted and centrifuged to give the mycelium and culture fluid.

The separated mycelium was extracted eight times with one-liter portions of butanol. The combined butanol extracts were evaporated under reduced pressure, with the addition of water, until a brown gum remained. This material was extracted twice with 250-milliliter portions of ethyl ether. The residual light brown powdery solid amounted to 4.6 grams and assayed 1300 dilution units per milligram.

The culture fluid, separated above, which amounted to 22 liters was extracted twice with four-liter portions of butanol. The butanol extracts, after washing with water, were evaporated under reduced pressure to give a brown gum. This residue after extraction with 500 milliliters of boiling ether amounted to 4.2 grams and assayed 500 dilution units of endomycin per milligram.

*Example VI.—Isolation and purification of endomycin*

Two hundred liters of a four day culture of *S. endus*, prepared as in Example I, and assaying 666 dilution units of endomycin per milliliter was mixed with four kilograms of diatomaceous earth filter aid. (Super Cel, Johns Manville Co.). After adjusting the suspension to pH 4.5 by the addition of sulfuric acid the suspension was filtered. The mycelial cake was washed with thirty liters of water, the filtrate and washings being discarded. The filter cake was eluted with sixty liters of 80 percent methanol and then with 24 liters of methanol. The eluates were combined and distilled under reduced pressure until an essentially water concentrate was obtained. The water concentrate was extracted with commercial hexane to remove fat and antifoam agent added during the fermentation. The residual water concentrate was made alkaline by the addition of ten grams of sodium bicarbonate per liter, a total of 150 grams being used. The alkaline suspension was warmed to 40 degrees centigrade, stirred for two hours and then filtered. The clear filtrate was adjusted to pH 4.8 by the addition of acetic acid and allowed to stand overnight at about five degrees centigrade. The resulting precipitate was collected and dried. There was thus obtained 140 grams of endomycin having a potency of 755 cup-plate units per milligram.

A 131-gram portion of the above product was thoroughly mixed with 1300 milliliters of 95 percent ethanol and filtered. To the clear filtrate 6500 milliliters of amyl acetate was added slowly with stirring, endomycin precipitating. The mixture was maintained at five degrees centigrade overnight after which the precipitate was collected and dried under reduced pressure. There was thus obtained 49.1 grams of endomycin as a brown powder having a potency of 1480 cup-plate units per milligram.

Having thus described our invention we claim:

1. A process for the production of endomycin which comprises the steps of introducing spores and vegetative mycelium of *Streptomyces endus* in an aqueous nutrient medium containing a mono-saccharide, dried brewers yeast, soybean meal, ammonium, potassium, sodium, phosphate, chloride and sulfate ions and after said aqueous nutrient medium has been fermented by said microorganism within the range of twenty degrees centigrade to thirty five degrees centigrade for a period of time of from about 44 to about 144 hours while maintaining the pH between about six to about 8.5, acidifying the aqueous fermented medium to a pH of about 4 to about 5.5, separating the insoluble mycelia and endomycin from the aqueous solution and recovering the endomycin from the mycelial cake.

2. A method which comprises the steps of growing *Streptomyces endus* in an aqueous solution containing about 25 parts corn sugar, about 2.5 parts dried brewers yeast, about five parts ammonium sulfate, about eight parts calcium carbonate, about 0.4 part potassium dihydrogen phosphate, about seven parts soybean meal and about four parts of a member of the group consisting of sodium chloride and potassium chloride and having a pH of between about six and about 8.5 at a temperature of about twenty-four degrees centigrade while aerating the aqueous solution, whereby endomycin is produced.

3. In a method for the preparation of endomycin the steps of acidifying an aqueous liquid fermented medium containing endomycin to a pH of between about four and about 5.5, separating the insoluble mycelia and endomycin from the aqueous solution and extracting endomycin from the mycelial cake by means of an aliphatic alcohol containing one to four carbon atoms and isolating the endomycin from the alcohol solution.

4. The method of claim 3 wherein the aqueous fermented medium containing endomycin is acidified to a pH of about 4.8.

5. In a method for the preparation of endomycin the step of adjusting the pH of an endomycin containing solution to about 4.8 whereby endomycin is rendered substantially water insoluble and separating the insoluble endomycin from the aqueous solution.

6. A substance effective in inhibiting the growth of fungi that has a molecular weight in the order of about 1300 to 1450, is soluble in water at pH 7.0 and greater and at pH 2.0 and lower and relatively insoluble in water at pH 4.0 to 6.0, substantially insoluble in ether, whose ultraviolet spectrum exhibits a characteristic doublet with maxima at 226 and 232 millimicrons, and whose infrared spectrum exhibits characteristic absorption maxima at the following wave lengths expressed in reciprocal centimeters: 3335, 2910, 1717, 1655, 1455, 1375, 1135, 1058, 986, 911, 853, 839 and 719.

7. A process for producing the antibiotic agent of claim 6 which comprises fermenting an aqueous nutrient medium containing carbohydrate and protein as carbon and nitrogen sources and nutrient salts under submerged aerobic conditions with *Streptomyces endus* until substantial antifungal activity is imparted to said solution and then recovering the said antibiotic agent from the fermentation broth.

References Cited in the file of this patent

UNITED STATES PATENTS 2,516,080    Sobin _____ July 18, 1950

OTHER REFERENCES

Alexopoulos: Ohio Jour. Science, 41, Studies in Antibiosis between Bacteria and Fungi, pgs. 425 to 929.

Waksman: Microbiol Antagonism and Antibiotic Substances, 1947, The Commonwealth Fund, pg. 118 2R–41–W25.

Welsch: J. Bact., vol. 42, pgs. 801–814, pub. 1941.

Annual Review of Microbiology, vol. 11, 1948, pg. 143, Bailey on "Antibiotics."

Emmart: "A Preliminary Report on a New Tuberculostatic Antibiotic from a Species of Nocardia," pub. Feb. 1, 1947, pgs. 2–13. Pg. 10 is most pertinent.

"New and Nonofficial Remedies," 1953, pgs. XXVIII, XXIX, XXX, and XXXI.

Thesis of Robert H. Smith, U. of Wisconsin, pg. 10, Jan. 23, 1953.

Smedby et al.: Phytopathology, pg. 506-510, vol. 42, 1952, pgs. 509 and 510 are especially pertinent.